United States Patent
Lorca Hernando et al.

(10) Patent No.: US 11,038,562 B2
(45) Date of Patent: Jun. 15, 2021

(54) METHOD AND DEVICE FOR GENERATING BROADCAST BEAMS IN MASSIVE MIMO SYSTEMS

(71) Applicant: TELEFÓNICA, S.A., Madrid (ES)

(72) Inventors: Javier Lorca Hernando, Madrid (ES); Elena Serna Santiago, Madrid (ES); Monica Marti Molina, Madrid (ES)

(73) Assignee: TELEFÓNICA, S.A., Madrid (ES)

( * ) Notice: Subject to any disclaimer, the term of this patent is extended or adjusted under 35 U.S.C. 154(b) by 0 days.

(21) Appl. No.: 17/032,708

(22) Filed: Sep. 25, 2020

(65) Prior Publication Data

US 2021/0099204 A1 Apr. 1, 2021

(30) Foreign Application Priority Data

Sep. 26, 2019 (EP) .................................... 19382830

(51) Int. Cl.
| | |
|---|---|
| *H04B 7/02* | (2018.01) |
| *H04B 7/0426* | (2017.01) |
| *H04B 7/0456* | (2017.01) |
| *H04B 7/06* | (2006.01) |

(52) U.S. Cl.
CPC .......... *H04B 7/043* (2013.01); *H04B 7/0456* (2013.01); *H04B 7/0608* (2013.01); *H04B 7/0617* (2013.01); *H04B 7/0686* (2013.01)

(58) Field of Classification Search
CPC .. H04B 7/0456; H04B 7/0608; H04B 7/0617; H04B 7/0686
USPC ................ 375/267, 260, 259, 219, 295, 316
See application file for complete search history.

(56) References Cited

U.S. PATENT DOCUMENTS

| | | | |
|---|---|---|---|
| 9,973,362 B2 | 5/2018 | Jia et al. | |
| 2016/0087829 A1 | 3/2016 | Jia et al. | |
| 2018/0006696 A1* | 1/2018 | Yue ........................ | H04B 7/063 |

FOREIGN PATENT DOCUMENTS

| | | |
|---|---|---|
| EP | 2806576 A1 | 11/2014 |
| EP | 3525361 A1 | 8/2019 |
| WO | 2018/103856 A1 | 6/2018 |

OTHER PUBLICATIONS

European Search Report from Corresponding EP Application No. 19382830, dated Feb. 5, 2020.

* cited by examiner

*Primary Examiner* — Zewdu A Kassa
(74) *Attorney, Agent, or Firm* — Workman Nydegger (57) ABSTRACT

A method and transmitter for generating broadcast beam patterns in massive MIMO systems, the transmitter comprising a rectangular antenna array with a number $N_1$ of antenna elements in the horizontal direction and a number $N_2$ of antenna elements in the vertical direction. The MIMO transmitter generates broadcast beam patterns with determined beam widths in horizontal and vertical dimensions to cover a sector area of a cell by the rectangular antenna array radiating $N_1 \times N_2$ radiofrequency signals at a carrier frequency, the sector area being where a user equipment requests from the MIMO transmitter access to the cell. The beam widths in horizontal and vertical directions are determined by using an optimum set of complex excitation coefficients calculated from a discretized continuous-space array factor $\psi(\theta,\varphi)$, which is based on a discretization over the elevation angle $\theta$ and the azimuth angle $\varphi$ of the antenna elements.

15 Claims, 3 Drawing Sheets

METHOD AND DEVICE FOR GENERATING BROADCAST BEAMS IN MASSIVE MIMO SYSTEMS

FIELD OF THE INVENTION

The present invention deals with the field of wireless communications, and more specifically with the optimal generation of broadcast beams in massive MIMO systems comprising a high number (tens or hundreds) of antennas at the base station side, subject to additional per-antenna transmit power constraints.

More particularly, the present invention proposes a method for generating broadcast beam patterns in massive MIMO systems, providing both sector-like coverage and the least possible dispersion of per-antenna transmit powers.

BACKGROUND OF THE INVENTION

Massive Multiple Input Multiple Output (Massive MIMO) techniques are reaching a considerable level of maturity as one of the most promising alternatives for increasing the spectral efficiency per unit area in cellular networks. Massive MIMO tries to multiplex users in the spatial domain thanks to the extra degrees of freedom provided by the excess antennas, by creating multiple beams tailored to the channel state conditions experienced by the users, while simultaneously keeping inter-user interference to a minimum.

Massive MIMO relies on suitable precoding mechanisms that benefit from the presence of large antenna arrays at the base station. A high degree of spatial resolution can be achieved by employing large arrays according to the Nyquist criterion. This characteristic is highly desirable for the beams carrying user payload information, but not for broadcast beams devoted to cell signalling. Broadcast channels carry essential information at cell level and must present sector-like coverage, similar to traditional low-order MIMO systems, where the broadcast beams should be decodable by the users without any prior available information about their channel state. This is applicable to users camping in the cell, users coming from neighbour cells, and users performing random access.

Low-order MIMO systems usually reserve a few (usually two) specific antenna ports for transmission of the broadcast signalling information. In massive MIMO systems, this strategy leads to the presence of high-power transmissions from a few power amplifiers, which are thus largely unbalanced in terms of size, heating, and cooling needs with respect to the other power amplifiers.

One of the attractiveness of massive MIMO is that it enables reduced per-antenna transmit powers, which in turn leads to smaller amplifier sizes and lower associated heating. The presence of multiple antennas allows generating multiple data beams with high spatial resolution. However, broadcast beams essentially require sector-like coverage with very low spatial resolution, so that all users are able to receive the intended cell information.

Prior state-of-the-art techniques usually yield sector-like radiation patterns without special care to the variations of per-antenna transmit powers. Reserving a reduced number of antennas for the broadcast beams has the drawback of requiring large power amplifiers connected to the antennas that carry broadcast information. Large power amplifiers are generally undesirable due to excessive cost, power consumption and heat dissipation.

For example, some approaches for common channel low PAPR (Peak-to-Average Power Ratio) signaling are disclosed in U.S. Pat. No. 9,973,362, based on i) a power amplifier set configured to transmit broad-beam signals over a frequency band narrower than the available bandwidth and modulated with a low PAPR sequence and ii) a second power amplifier set configured to transmit narrow-beam unicast signals. This means the presence of large power amplifiers connected to a few antennas devoted to control signalling, while the remaining amplifiers can have much smaller sizes and transmit powers.

It is much more desirable to exploit the presence of a large number of antennas so as to minimize the per-antenna transmit powers even for the broadcast channels. However, by doing so, very sharp beams are usually created unless special techniques are devised to generate the excitation coefficients.

In other techniques, broadcast beams are generated without optimizing the dispersion in per-antenna transmit powers, which would be desirable to improve the efficiencies of the power amplifiers. For example, WO2018103856A1 describes an apparatus for generating broadcast beams, comprising different sets of dual polarized antenna elements and each dual polarized antenna element being adapted to broadcast signals with a first polarization as well as a second polarization. Each dual polarized antenna element has a first input and a second input: the first input feeds signals to the respective elements of the antenna which radiate with the first polarization and the second input feeds signals to the respective elements of the antenna which radiate with the second polarization.

Therefore, there is a need in the state of the art for providing smart strategies for generating broadcast beams in order to avoid large imbalances between the transmit powers of the array antennas, while simultaneously yielding sector-like coverage.

SUMMARY OF THE INVENTION

The present invention solves the aforementioned problems and overcomes previously explained state-of-art work limitations by providing a method to derive suitable excitation coefficients for generating broadcast beams in massive-MIMO base stations using rectangular antenna arrays for wireless cellular communications, such that a given sector-like radiation pattern is obtained in horizontal and vertical dimensions while keeping the maximum variation of per-antenna transmission powers under certain limits. Yielding a sector-like radiation pattern is necessary for transmission of broadcast control channels.

In the context of the invention, the following concepts are used:

Entropic uncertainty, defined as the sum of the temporal and spectral Shannon entropies.

Entropic uncertainty principle, which states that the entropic uncertainty is always lower-bounded by a given quantity, which is analogous to the Heisenberg uncertainty principle.

The present invention describes a method to derive a set of excitation coefficients in a rectangular antenna array with $N_1$ and $N_2$ antenna elements in the horizontal and vertical directions respectively.

The method aims to find suitable excitation coefficients that yield broadcast beam patterns with the least possible variation of per-antenna transmission powers. The excitation coefficients can be written in vector form:

$$A_{vec} = \{a_{nm}, n=0, \ldots, N_1-1, m=0, \ldots, N_2-1\}_{N_1 N_2 \times 1},$$

where the vector $A_{vec}$ has $N_1N_2$ complex elements $a_{nm} \in \mathbb{C}$, which minimize the following expression:

$$A_{vec} = \text{argmin}\{-H(A_{vec}) - H(\Psi_{vec})\},$$

and where the vector $\Psi_{vec}$ is the discretized array factor vector defined as:

$$\Psi_{vec} = \{\psi_{kl}, k=0, \ldots, N_1-1, l=0, \ldots, N_2-1\}_{N_1N_2 \times 1}$$

with $N_1N_2$ complex elements $\psi_{kl} \in \mathbb{C}$,
and H denotes the Shannon entropy for a sequence of N complex numbers $\{X_n\}$ which is defined as:

$$H(X) = -\sum_{n=0}^{N-1}|X_n|^2\ln|X_n|^2.$$

Denoting $A = \{a_{nm}\}_{N_1 \times N_2}$ as an $N_1 \times N_2$ rectangular matrix containing the set of discrete excitation coefficients, and $\Psi = \{\psi_{kl}\}_{N_1 \times N_2}$ its counterpart in the array factor domain, the discretized array factor $\Psi$ can be written as:

$$\Psi = M_{N_1}^{IDFT} \cdot A \cdot M_{N_2}^{IDFT},$$

where the constituent Inverse Discrete Fourier transform (IDFT) matrix $M_M^{IDFT}$ of dimension M×M is defined as:

$$M_M^{IDFT} = \frac{1}{\sqrt{M}}\left\{\exp\left(j\frac{2\pi}{M}nk\right)\right\}_{M \times M}, n, k = 0, \ldots, M-1,$$

and the discretization is accomplished by means of the expressions:

$$u = \sin\theta\cos\varphi,$$

$$v = \sin\theta\sin\varphi,$$

$$\psi_{kl} \equiv \psi(u_k, v_l),$$

$$u_k = k \cdot \Delta u, k = -\frac{N_1}{2}, \ldots, \frac{N_1}{2} - 1, \Delta u = \frac{\lambda}{N_1 d_x},$$

$$v_l = l \cdot \Delta v, l = -\frac{N_2}{2}, \ldots, \frac{N_2}{2} - 1, \Delta v = \frac{\lambda}{N_2 d_y},$$

where $\lambda$ is the wavelength at the carrier frequency of interest, $\theta$, $\varphi$ are the spherical coordinates ($\theta$ is the elevation angle, $\varphi$ is the azimuth angle) and $d_x$, $d_y$ are the inter-antenna spacing in the horizontal and vertical directions respectively.

Once the optimum set of excitation coefficients $\{a_{nm}\}$ is found, the continuous-space array factor can be calculated by means of the expression:

$$\Psi(\theta, \varphi) = \sum_{n=0}^{N_1-1}\sum_{m=0}^{N_2-1} a_{nm}\exp\left(j\frac{2\pi d_x}{\lambda}n\sin\theta\cos\varphi\right)\exp\left(j\frac{2\pi d_y}{\lambda}m\sin\theta\sin\varphi\right).$$

The above described minimization problem can be solved by using global minimization techniques, like genetic algorithms, Monte Carlo methods, simulated annealing, or any other suitable procedure to find a global minimum of a function/expression of multiple variables.

The speed of convergence of the minimization algorithm can be improved by padding the set of coefficients A with $P_1$, $P_2$ zeros in the x and y directions respectively, i.e. by defining an extended excitation vector A' in the form:

$$A' = \{a_{ij}\}_{(N_1+P_1) \times (N_2+P_2)}, \text{ where:}$$

$$a_{ij} = \begin{cases} a_{nm}, 0 \leq i < N_1, 0 \leq j < N_2, \\ 0, \text{ elsewhere,} \end{cases}$$

and reformulating the minimization problem as:

$$A'_{vec} = \text{argmin}\{-H(A'_{vec}) - H(\Psi'_{vec})\},$$

where $A'_{vec} \equiv \text{vec}(A'), \Psi'_{vec} \equiv \text{vec}(\Psi')$, and $$\Psi' = M_{N_1+P_1}^{IDFT} \cdot A' \cdot M_{N_2+P_2}^{IDFT}.$$

The entropy of the extended set of coefficients $H(A_{ext})$ can be calculated by means of the expression:

$$H(A'_{vec}) = H(\{A_{vec}, 0, \ldots, 0\}) = -\sum_{n,m=0}^{N_1N_2-1}|a_{nm}|^2\ln|a_{nm}|^2.$$

Additional restrictions can be included to improve the search of a global minimum. These restrictions allow discarding non-suitable solutions in the search of the global minimum. As an example, the following expressions describe restrictions that can be applied to the optimization problem for the radiation diagram to show a given maximum ripple within the desired range of azimuth and elevation angles, and the per-antenna transmission powers to not exceed a given transmit power:

$$\max|\psi_{ij}(\text{dB}) - \psi_{kl}(\text{dB})|_{(i,j) \neq (k,l)} \leq \text{Max\_Ripple(dB)}; \forall\{(i,j),(k,l)\} \in C,$$

$$|a_{nm}|^2 \leq \text{Power\_Threshold}, \forall m, n$$

where Max_Ripple is the maximum variation (in dB) of the discretized array factor in the sector of interest; Power_Threshold denotes the maximum per-antenna transmit power; C represents the discrete indices of $(u_k, v_l)$ points within the sector of interest:

$$C = \left\{(k, l): \varphi_k \in \left(-\frac{\varphi_{max}}{2}, \frac{\varphi_{max}}{2}\right), \theta_l \in \left(-\frac{\theta_{max}}{2}, \frac{\theta_{max}}{2}\right)\right\};$$

and $\varphi_{max}$, $\theta_{max}$ denote respectively the maximum azimuth and elevation angles characterizing the sector.

The obtained continuous-space array factor can be further improved by applying additional spatial filtering techniques that reduce the maximum ripple Max_Ripple in horizontal and vertical dimensions respectively (i.e., the maximum variation of the array factor in azimuth and/or elevation is reduced within the sector of interest), while keeping the variations in per-antenna transmission powers under bounded limits.

An aspect of the present invention refers to a method for generating broadcast beams in massive MIMO systems, which comprises the following steps:

defining a sector area of a cell covered by a MIMO transmitter, the sector area being where at least one user equipment requests from the MIMO transmitter access to the cell; generating broadcast beam patterns with determined beam widths in horizontal and vertical dimensions to cover the sector area by a rectangular antenna array of the MIMO transmitter, the rectangular antenna array formed by a number $N_1$ of antenna elements in the horizontal direction and a number $N_2$ of antenna elements in the vertical direction radiating $N_1 \times N_2$ radiofrequency signals at a carrier frequency, with inter-antenna spacing in the horizontal and vertical directions given by $d_x$ and $d_y$ respectively, the beam widths in horizontal and vertical directions being determined by using an optimum set of excitation coefficients which are calculated by means of the following steps:

discretizing a continuous-space array factor $\psi(\theta, \varphi)$ to obtain a discretized array factor $\psi(u_k, v_l) \equiv \psi_{kl} \in \mathbb{C}$, formed by a discrete set of complex values $\psi_{kl} \in \mathbb{C}$, $k=0, \ldots, N_1-1$, $l=0, \ldots, N_2-1$, where the indices k, l obey to a discretization over the elevation angle $\theta$ and the azimuth angle $\varphi$ of the antenna elements; and obtaining the optimum set of excitation coefficients $\{a_{nm}\}$, in which $a_{nm} \in \mathbb{C}$ are complex excitation coefficients that minimize the following expression:

$$A_{vec} = \mathrm{argmin}\{-H(A_{vec}) - H(\Psi_{vec})\},$$

where $$A_{vec} = \{a_{nm}, n=0, \ldots, N_1-1, m=0, N_2-1\}_{N_1 N_2 \times 1},$$

$$\Psi_{vec} = \{\psi_{kl}, k=0, \ldots, N_1-1, l=0, \ldots, N_2-1\}_{N_1 N_2 \times 1},$$

and H denotes the Shannon entropy for a sequence of N complex numbers $\{X_n\}$ which is defined as:

$$H(X) = -\sum_{n=0}^{N-1} |X_n|^2 \ln |X_n|^2.$$

Another aspect of the present invention refers to a transmitter device of a massive MIMO system implementing the method for generating broadcast beams described above.

In a last aspect of the present invention, a computer program is disclosed, comprising computer program code means adapted to perform the steps of the described method, when said program is run on processing means of a massive MIMO transmitter device.

The method and transmitter in accordance with the above described aspects of the invention has a number of advantages with respect to prior art, which can be summarized as follows:

The present invention optimizes the excitation coefficients for any sector-like radiation pattern in azimuth and elevation. Additional restrictions can also be applied to speed up the convergence of the algorithm. Interpolation and spatial filtering techniques can also improve the radiation characteristics of the obtained coefficients according to implementation needs.

The constraint of the least possible dispersion of per-antenna transmission powers helps reducing the imbalance in size and power consumption between the power amplifiers that feed the antenna array.

These and other advantages will be apparent in the light of the detailed description of the invention.

DESCRIPTION OF THE DRAWINGS

For the purpose of aiding the understanding of the characteristics of the invention, according to a preferred practical embodiment thereof and in order to complement this description, the following Figures are attached as an integral part thereof, having an illustrative and non-limiting character.

PREFERRED EMBODIMENT OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Of course, the embodiments of the invention can be implemented by means of software elements, hardware elements, firmware elements, or any suitable combination of them and in a variety of architectural platforms, operating and server systems, devices, systems, or applications. Any particular architectural layout or implementation presented herein is provided for purposes of illustration and comprehension only and is not intended to limit aspects of the invention.

Figure 1:
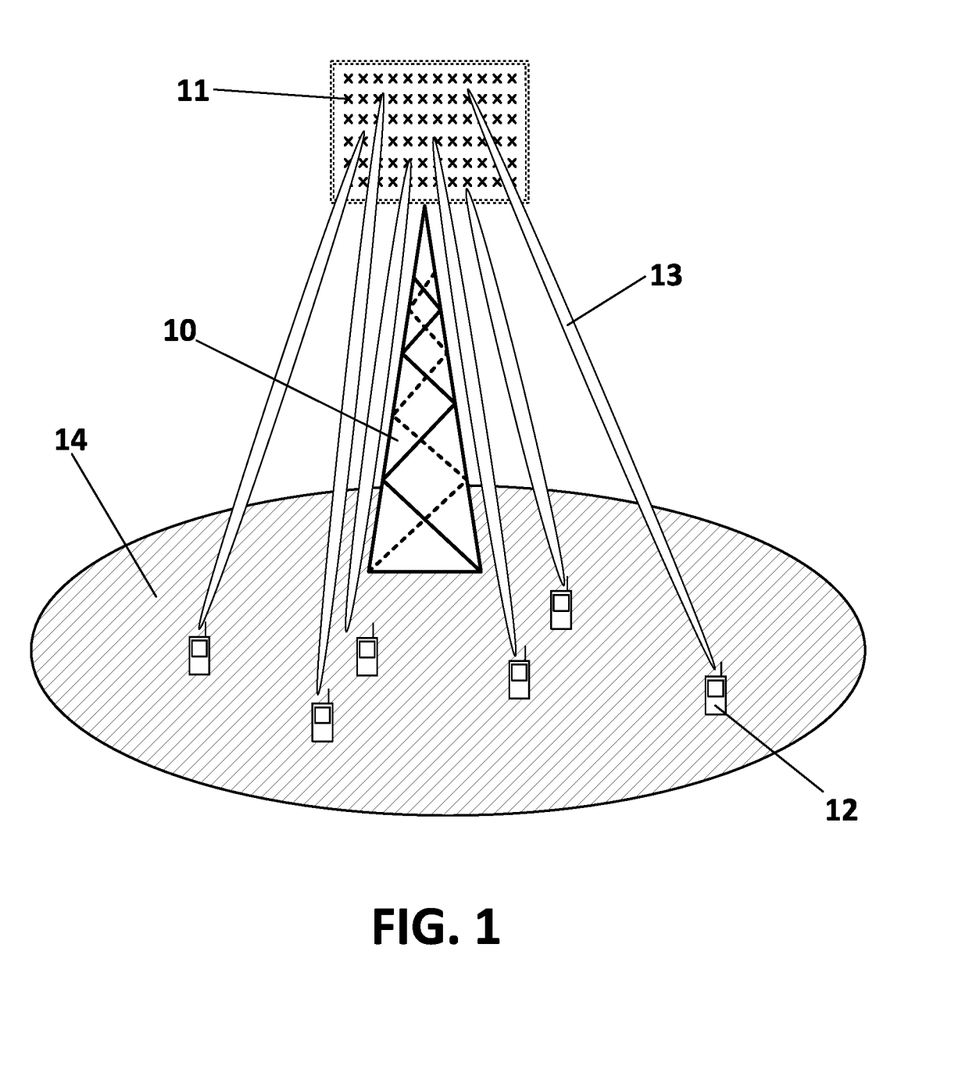
FIG. 1 shows a massive MIMO system with a rectangular array of multiple antennas at the base station, according to a possible application scenario of the invention.

FIG. 1 shows the basic scenario for applicability of the proposed invention. A massive MIMO (Multiple-Input, Multiple-Output) system comprises an array of multiple antennas (11) at the base station (10) side following a rectangular arrangement, as depicted in FIG. 1, which are connected to a similar set of RF (Radio Frequency) units, transmitters and receivers, which provide full control of the transmission and reception of the signals. One or more UEs or User Equipments (12) try to perform a first connection to the base station (10) by means of a cell camping procedure. Camping in the cell requires the presence of suitable broadcast control channels, by means of which the UEs (12) get some essential control information like the system bandwidth, frame number, random access parameters, and others. Such broadcast control channels must cover the entire sector area (14), hence, not assuming any prior knowledge of user-related information like its position or channel state. Consequently, broadcast control channels cannot benefit from beamforming, and should present a sector-like radiation pattern unless some beam-sweeping mechanism is enabled, which can be characteristic of carrier frequencies in the millimeter-wave regime and is out of the scope of the present invention.

The objective of this proposal is to find a set of complex excitation coefficients to apply at the RF units connected to the antennas of the array (11), in order to yield the desired sector-like pattern for the radiation beam (13) of the broadcast control channels, complying with the condition that said coefficients present the least possible variation in per-antenna transmission powers.

In order to explain the details of the proposed method to obtain the aforementioned complex excitation coefficients, consider the Shannon entropy of a sequence of N complex numbers $\{X_n\}$, which can be defined for the discrete case as:

$$H(X) = -\sum_{n=0}^{N-1} |X_n|^2 \ln |X_n|^2.$$

If $\{Y_n\}$ denotes the DFT (Discrete Fourier Transform) of the sequence of complex numbers $\{X_n\}$, and its corresponding Shannon entropy, H(Y), is calculated, the so-called entropic uncertainty principle is satisfied and can be written as:

$$H(X)+H(Y) \geq \ln N.$$

The equality in the above expression is only obtained for translations and modulations of a Kronecker comb function of period equal to any divisor of N, which is the discrete version of the continuous impulse train.

It is possible to relate the above entropic uncertainty principle with the aim of the proposed method: obtaining the optimum excitation coefficients to yield sector coverage that present the least variation in per-antenna transmission powers.

Figure 2:
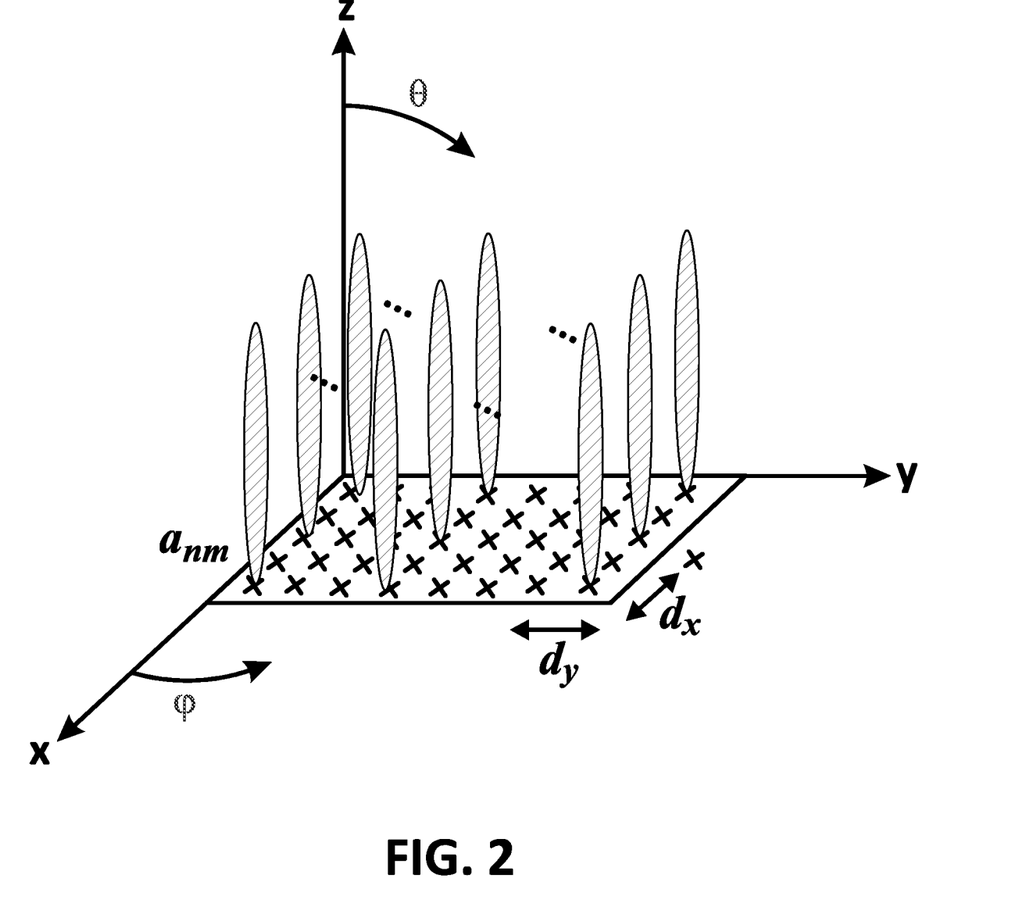
FIG. 2 shows a graphical representation of a geometrical arrangement of the multiple antennas in the rectangular array and the resulting array factor in three dimensions, according to a possible embodiment of the invention.

Assuming a rectangular antenna array with $N_1$ and $N_2$ antenna elements in horizontal x and vertical y axis, respectively, the objective is to find suitable excitation coefficients $\{a_{nm} \in \mathbb{C}\}$ that yield sector coverage while presenting the least possible dispersion of per-antenna transmit powers, where n and m are indices in the range $0, \ldots, N_1$ and $0, \ldots, N_2$ respectively. The array factor obtained from such excitation coefficients is given by the following expression:

$$\Psi(\theta, \varphi) = \sum_{n=0}^{N_1-1} \sum_{m=0}^{N_2-1} a_{nm} \exp\left(j\frac{2\pi d_x}{\lambda} n \sin\theta\cos\varphi\right) \exp\left(j\frac{2\pi d_y}{\lambda} m \sin\theta\sin\varphi\right),$$

where, as shown in FIG. 2, $d_x$, and $d_y$, are the inter-antenna spacing in x and y directions, respectively; $\lambda$ is the wavelength at the carrier frequency of interest; and $\theta$, $\varphi$ are respectively the elevation and azimuth angles also depicted in FIG. 2.

For simplicity, it is convenient to consider normalized excitation coefficients such that the sum of the squared coefficients is unity, which means that the total transmit power is also unity, i.e.:

$$\sum_{n,m} |a_{nm}|^2 = 1.$$

By making a change of variables and introducing the so-called directional cosines u, v, defined by:

$$u = \sin\theta\cos\varphi,$$

$$v = \sin\theta\sin\varphi,$$

the array factor simplifies to:

$$\Psi(u, v) = \sum_{n=0}^{N_1-1} \sum_{m=0}^{N_2-1} a_{nm} \exp\left(j\frac{2\pi d_x}{\lambda} nu\right) \exp\left(j\frac{2\pi d_y}{\lambda} mv\right),$$

$$u \in [-1, 1], v \in [-1, 1].$$

Further discretization is feasible by choosing suitable sampling periods in u and v obeying the Nyquist criterion, by which the sampling periods in (u, v) shall be at most equal to the inverse of the normalized overall dimensions in (x, y), that is:

$$\Delta u \leq \frac{\lambda}{N_1 d_x} = \frac{2}{N_1}$$

$$\Delta v \leq \frac{\lambda}{N_2 d_y} = \frac{2}{N_2}$$

The last equality is obtained by making the inter-antenna spacing equal to $\lambda/2$ in both directions.

By choosing the maximum possible sampling periods given by the Nyquist criterion, the discretized variables $u_k$, $v_l$ are:

$$u_k = k \cdot \Delta u, k = -\frac{N_1}{2}, \ldots, \frac{N_1}{2} - 1.$$

$$v_l = l \cdot \Delta v, l = -\frac{N_2}{2}, \ldots, \frac{N_2}{2} - 1.$$

And applying the above definitions of the discretized variables $u_k, v_l$ for the discretized array factor:

$$\Psi(u_k, v_l) \equiv \psi_{kl} = \sum_{n=0}^{N_1-1} \sum_{m=0}^{N_2-1} a_{nm} \exp\left(j\frac{2\pi}{N_1} nk\right) \exp\left(j\frac{2\pi}{N_2} ml\right).$$

The above expression has the form of a two-dimensional inverse DFT except for a normalization constant. Normalization is desirable to avoid changes in the overall power when applying DFT and inverse DFT (IDFT) operations. Without loss of generality, the indices k, l can also be changed to run from 0 to $N_1-1$ and from 0 to $N_2-1$ respectively. This change only introduces a constant phase term in the array factor, that can be further corrected to steer the maximum radiation towards any desired direction.

Denoting $A = \{a_{nm}\}_{N_1 \times N_2}$ as an $N_1 \times N_2$ rectangular matrix containing the set of discrete excitation coefficients, and $\Psi = \{\psi_{kl}\}_{N_1 \times N_2}$ its counterpart in the array factor domain, the discretized array factor can be written as:

$$\Psi = M_{N_1}^{IDFT} \cdot A \cdot M_{N_2}^{IDFT},$$

where the constituent IDFT matrix $M_M^{IDFT}$ of dimension M×M is defined as:

$$M_M^{IDFT} = \frac{1}{\sqrt{M}} \left\{\exp\left(j\frac{2\pi}{M} nk\right)\right\}_{M \times M}, n, k = 0, \ldots, M-1.$$

The inverse transformation reads:

$$A = M_{N_1}^{DFT} \cdot \Psi \cdot M_{N_2}^{DFT}$$

where the DFT matrix is the conjugate of the IDFT matrix, i.e.

$$M_M^{DFT} = (M_M^{IDFT})^* = \frac{1}{\sqrt{M}} \left\{\exp\left(-j\frac{2\pi}{M} nk\right)\right\}_{M \times M}, n, k = 0, \ldots, M-1.$$

It is convenient to write both A and $\Psi$ matrices in vector form, i.e.:

$$A_{vec} \equiv \text{vec}(A) = \{a_{nm}, n=0, \ldots, N_1-1, m=0, \ldots, N_2-1\}_{N_1 N_2 \times 1},$$

$$\Psi_{vec} \equiv \text{vec}(\Psi) = \{\psi_{kl}, k=0, \ldots, N_1-1, l=0, \ldots, N_2-1\}_{N_1 N_2 \times 1}.$$

With this notation, the objective is to find a suitable vector $A_{vec}$ such that the Shannon entropy is maximized:

$$A_{vec} = \mathrm{argmax}\{-H(A_{vec}) - H(\Psi_{vec})\}.$$

The maximization of the Shannon entropy is aimed at minimizing the dispersion of per-antenna transmit powers while yielding the desired sector-like radiation pattern, so that the efficiencies of the power amplifiers are maximized.

This maximization problem can be transformed into a global minimization problem by resorting to the negatives of the above magnitudes:

$$A_{vec} = \mathrm{argmin}\{-H(A_{vec}) - H(\Psi_{vec})\}.$$

Multiple techniques exist for solving global minimization problems, like genetic algorithms, Monte Carlo-based algorithms, simulated annealing, or Basin-Hopping, to name a few. Genetic algorithms are a good set of techniques aimed to accelerate the search for a global minimum. Many other algorithms can also be applied for this purpose.

In order to accelerate the convergence of the algorithm used for the global minimization problem, it is convenient to include additional restrictions to skip non-suitable solutions in the search for the global minimum. Restrictions are evaluated in every iteration in order to check whether some conditions are met. These restrictions can be applied to both the discretized array factor and the antenna excitations. As an example, the array factor can be constrained to show a given maximum ripple within the desired range of azimuth and elevation angles, and the per-antenna transmission powers can be constrained so as not to exceed a given transmit power. Other similar restrictions can also be imposed according to the specifics of the application.

The following expressions show the aforementioned exemplary restrictions:

$$\max |\psi_{ij}(\mathrm{dB}) - \psi_{kl}(\mathrm{dB})|_{(i,j) \neq (k,l)} \leq \mathrm{Max\_Ripple}(\mathrm{dB}); \forall \{(i, j), (k,l)\} \in C,$$

$$|a_{nm}|^2 \leq \mathrm{Power\_Threshold}, \forall m, n$$

where Max_Ripple is the maximum variation (in dB) of the discretized array factor in the sector of interest; Power_Threshold denotes the maximum per-antenna transmit power; C represents the discrete indices of $(u_k, v_l)$ points within the sector of interest:

$$C = \left\{(k,l) : \varphi_k \in \left(-\frac{\varphi_{max}}{2}, \frac{\varphi_{max}}{2}\right), \theta_l \in \left(-\frac{\theta_{max}}{2}, \frac{\theta_{max}}{2}\right)\right\};$$

$\varphi_{max}, \theta_{max}$ denote respectively the maximum azimuth and elevation angles characterizing the sector.

Once the optimum solution is obtained, the array factor in continuous space can be calculated in a straightforward way from the obtained set of excitation coefficients. However, there is always a discrepancy between the discretized and the continuous-space array factors, that stems from any eventual phase changes between adjacent $\psi_{ij}$ points which lead to unexpected changes in the corresponding amplitudes of the continuous-space array factor. To alleviate this problem, it is possible to improve the accuracy of the discretized array factor by padding the excitation coefficients with $P_1$, $P_2$ zeros in the x and y directions respectively:

$$A' = \{a_{ij}\}_{(N_1+P_1) \times (N_2+P_2)},$$

where:

$$a_{ij} = \begin{cases} a_{nm}, & 0 \leq i < N_1, 0 \leq j < N_2, \\ 0, & \text{elsewhere.} \end{cases}$$

The vector form of the zero-padded excitation coefficients $A'$ can be simply written as an extended version of $A_{vec}$ with $(P_1+P_2)$ additional zeroes:

$$A'_{vec} = \{A_{vec}, 0, \ldots, 0\}_{(N_1+P_1)(N_2+P_2) \times 1}.$$

The discretized array factor $\Psi'$ corresponding to $A'$ resembles the continuous array factor more closely than $\Psi$, where the relation between $A'$ and $\Psi'$ is now written as:

$$\Psi' = M_{N_1+P_1}^{IDFT} \cdot A' \cdot M_{N_2 P_2}^{IDFT}.$$

It is thus possible to reformulate the global minimization problem:

$$A'_{vec} = \mathrm{argmin}\{-H(A'_{vec}) - H(\Psi'_{vec})\},$$

where $A'_{vec} \equiv \mathrm{vec}(A')$, $\Psi'_{vec} \equiv \mathrm{vec}(\Psi')$.

For this alternative formulation to make sense, the entropy of the zero-padded excitation vector $A'_{vec}$ must be defined even when some of its terms are zero, where the expression xlogx does not make sense. Given that:

$$\lim_{x \to 0} x \log x = 0,$$

it is possible to define the entropy of a null value as its limit at the origin, i.e.:

$$H(\{0\}) \equiv \lim_{x \to 0} H(x) = 0.$$

Hence the entropy of $A'_{vec}$ can be calculated, using the same expression of the non-extended case, by discarding the additional null terms:

$$H(A'_{vec}) = H(\{A_{vec}, 0, \ldots, 0\}) = -\sum_{n,m=0}^{N_1 N_2 - 1} |a_{nm}|^2 \ln |a_{nm}|^2.$$

Once a given solution is obtained, additional improvements can be achieved by further filtering the continuous-space array factor obtained from the optimum set of coefficients. Such filtering generally reduces the ripple in azimuth and/or elevation, but care should be taken in order to not exceed the maximum per-antenna transmit powers as they are usually changed by the filtering operation.

The proposed method to generate broadcast beams using the calculated optimum set of excitation coefficients, according to a preferred embodiment, can be implemented in a massive MIMO transmitter, which can be a base station of a wireless communication system or any other potential stationary or mobile station for transmitting broadcast beams to other entities of the communication system.

Figure 3:
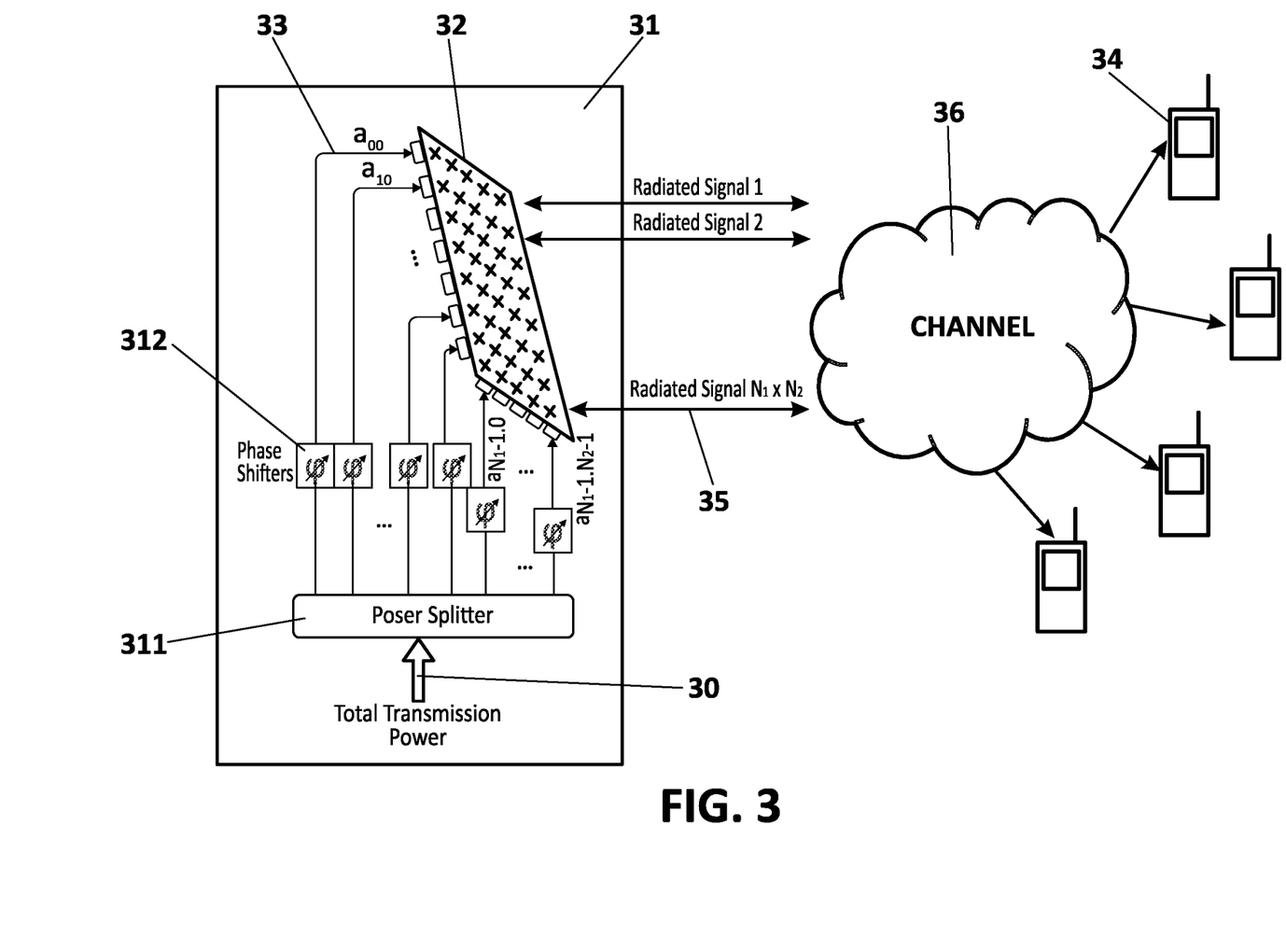
FIG. 3 shows a massive MIMO transmitter with a rectangular array of multiple antennas implementing a method for generating broadcast beams, according to a preferred embodiment of the invention.

FIG. 3 illustrates an embodiment for application of the proposed method. A massive-MIMO transmitter (31), equipped with a large rectangular antenna array (32) with a number $N_1$ of antenna elements in the horizontal direction and a number $N_2$ of antenna elements in the vertical direction, is aimed to cover a given sector area for transmission of the required broadcast signalling information. The total transmission power (30) is distributed by the power splitter (311) of the transmitter (31) into $N_1 \times N_2$ phase shifters (312) connected to the rectangular array (32) of antenna elements. Appropriate excitation coefficients (33) are required by the RF units of each antenna element to yield the desired radiation pattern, without any prior knowledge of the user channel state information and having the least possible dispersion of per-antenna transmit powers such that the imbalances between power amplifiers are minimized. One or more user devices (34) are thus able to acquire the basic signalling information required for camping in the cell. The proposed MIMO transmitter (31) provides a suitable procedure to find the optimum excitation coefficients (33) as described before, to be used in the generation of the $N_1 \times N_2$ radiated signals (35) transmitted to the user devices (34) through the user channel (36).

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for generating broadcast beam patterns in massive MIMO systems comprising:
    defining a sector area of a cell covered by a MIMO transmitter, the sector area being where at least one user equipment requests from the MIMO transmitter access to the cell;
    generating broadcast beam patterns with determined beam widths in horizontal and vertical dimensions to cover the sector area by a rectangular antenna array of the MIMO transmitter, the rectangular antenna array formed by a number $N_1$ of antenna elements in the horizontal direction and a number $N_2$ of antenna elements in the vertical direction radiating $N_1 \times N_2$ radiofrequency signals at a carrier frequency, with inter-antenna spacing in the horizontal and vertical directions given by $d_x$ and $d_y$ respectively, the beam widths in horizontal and vertical directions being determined by using an optimum set of excitation coefficients;
    wherein the excitation coefficients are calculated by means of the following steps:
    discretizing a continuous-space array factor $\psi(\theta, \varphi)$ to obtain a discretized array factor $\psi(u_k, v_l) \equiv \psi_{kl} \in \mathbb{C}$, formed by a discrete set of complex values $\psi_{kl} \in \mathbb{C}$, $k=0, \ldots, N_1-1$, $l=0, \ldots, N_2-1$, where the indices k, l, obey to a discretization over the elevation angle $\theta$ and the azimuth angle $\varphi$ of the antenna elements; and
    obtaining the optimum set of excitation coefficients $\{a_{nm}\}$, in which $a_{nm} \in \mathbb{C}$ are complex excitation coefficients that minimize the following expression:

$$A_{vec} = \mathrm{argmin}\{-H(A_{vec}) - H(\Psi_{vec})\},$$

where $$A_{vec} = \{a_{nm}, n=0, \ldots, N_1-1, m=0, \ldots, N_2-1\}_{N_1 N_2 \times 1},$$

$$\Psi_{vec} = \{\psi_{kl}, k=0, \ldots, N_1-1, l=0, \ldots, N_2-1\}_{N_1 N_2 \times 1}$$

and H denotes the Shannon entropy for a sequence of N complex numbers $\{X_n\}$ which is defined as:

$$H(X) = -\sum_{n=0}^{N-1} |X_n|^2 \ln |X_n|^2.$$

2. The method according to claim 1, wherein the discretization of the continuous-space array factor $\psi(\theta, \varphi)$ comprises:
    introducing the directional cosines u, v as functions of the elevation angle $\theta$ and azimuth angle $\varphi$, by means of the expressions:

$$u = \sin \theta \cos \varphi,$$

$$v = \sin \theta \sin \varphi;$$

and
    discretizing said directional cosines by introducing sampling periods $\Delta u$, $\Delta v$ that obey the Nyquist criterion, according to the following expressions:

$$\Delta u = \frac{2}{N_1}, \Delta v = \frac{2}{N_2},$$

$$u_k = k \cdot \Delta u, k = -\frac{N_1}{2}, \ldots, \frac{N_1}{2} - 1,$$

$$v_l = l \cdot \Delta v, l = -\frac{N_2}{2}, \ldots, \frac{N_2}{2} - 1.$$

3. The method according to claim 1, wherein the discretized array factor $\psi(u_k, v_l) \equiv \psi_{kl} \in \mathbb{C}$ is obtained, for the set of complex excitation coefficients $a_{nm}$, in the form:

$$\psi_{kl} = \frac{1}{\sqrt{N_1 N_2}} \sum_{n=0}^{N_1-1} \sum_{m=0}^{N_2-1} a_{nm} \exp\left(j \frac{2\pi}{N_1} nk\right) \exp\left(j \frac{2\pi}{N_2} ml\right),$$

$$k = 0, \ldots, N_1-1, l = 0, \ldots, N_2-1,$$

and the continuous-space array factor $\Psi(\theta, \varphi)$ is obtained from the set of complex excitation coefficients $a_{nm}$ by means of the expression:

$$\Psi(\theta, \varphi) = \sum_{n=0}^{N_1-1} \sum_{m=0}^{N_2-1} a_{nm} \exp\left(j \frac{2\pi d_x}{\lambda} n \sin\theta\cos\varphi\right) \exp\left(j \frac{2\pi d_y}{\lambda} m \sin\theta\sin\varphi\right),$$

where $\lambda$ is the wavelength at the carrier frequency of the antenna array.

4. The method according to claim 1, wherein the excitation coefficients $a_{nm}$ satisfy the condition that $\Sigma_{n,m} |a_{nm}|^2 = 1$, to obtain a total transmission power of the antenna array equal to unity.

5. The method according to claim 1, wherein the relationship between the excitation coefficients $a_{nm}$ and the discretized array factor $\psi(u_k, v_l) \equiv \psi_{kl} \in \mathbb{C}$ is:

$$\Psi = M_{N_1}^{IDFT} \cdot A \cdot M_{N_2}^{IDFT},$$

where $A = \{a_{nm}\}_{N_1 \times N_2}$ is a $N_1 \times N_2$ rectangular matrix containing the set of complex excitation coefficients $a_{nm}$, $\Psi = \{\psi_{kl}\}_{N_1 \times N_2}$ denotes its counterpart in the array factor domain, and the constituent IDFT matrix $M_M^{IDFT}$ of dimension $M \times M$ is defined as:

$$M_M^{IDFT} = \frac{1}{\sqrt{M}}\left\{\exp\left(j\frac{2\pi}{M}nk\right)\right\}_{M\times M}, n,k = 0,\ldots,M-1.$$

6. The method according to claim 1, further comprising: padding the excitation coefficients $a_{nm}$, with a number $P_1$ of zeros in the horizontal direction and a number $P_2$ of zeros in the vertical direction, by means of an extended matrix A' defined as:

$$A' = \{a_{ij}\}_{(N_1+P_1)\times(N_2+P_2)}; a_{ij} = \begin{cases} a_{nm}, 0 \leq i < N_1, 0 \leq j < N_2 \\ 0, \text{elsewhere} \end{cases},$$

to obtain a vector $A'_{vec}$ of the zero-padded excitation coefficients, $A'_{vec}=\{A_{vec}, 0, \ldots, 0\}_{(N_1+P_1)(N_2+P_2)\times 1}$; and calculating a global minimum of the following expression:

$$A'_{vec}=\text{argmin}\{-H(A'_{vec})-H(\Psi'_{vec})\},$$

where the entropy of the vector $A'_{vec}$ is calculated by means of the expression:

$$H(A'_{vec}) = H(\{A_{vec}, 0, \ldots, 0\}) = -\sum_{n,m=0}^{N_1 N_2 - 1} |a_{nm}|^2 \ln |a_{nm}|^2.$$

and where $\Psi'_{vec}$ denotes a vector form of an extended discretized array factor $\Psi'$ defined as the counterpart of the extended matrix A' in the array factor domain:

$$\Psi' = M_{N_1+P_1}^{IDFT} \cdot A' \cdot M_{N_2+P_2}^{IDFT}.$$

7. The method according to claim 6, wherein the global minimum is calculated by means of genetic algorithms, Monte Carlo algorithms, simulated annealing algorithms or Basin Hopping algorithms.

8. The method according to claim 1, further comprising calculating a maximum variation, Max_Ripple, in decibels, of the discretized array factor $\psi(u_k, v_l) \equiv \psi_{kl} \in \mathbb{C}$ to meet:
a maximum azimuth $\varphi_{max}$ angle and a maximum elevation angle $\theta_{max}$ for the sector area, and
a maximum Power_Threshold of transmission power per antenna,
by means of the following expressions:

$$\max |\psi_{ij}(dB) - \psi_{kl}(dB)|_{(i,j) \neq (k,l)} \leq \text{Max\_Ripple}(dB); \forall \{(i,j),(k,l)\} \in C,$$

$$|a_{nm}|^2 \leq \text{Power\_Threshold}, \forall m,n$$

where C denotes the discrete indices of $(u_k, v_l)$ points within the sector area:

$$C = \left\{(k,l): \varphi_k \in \left(-\frac{\varphi_{max}}{2}, \frac{\varphi_{max}}{2}\right), \theta_l \in \left(-\frac{\theta_{max}}{2}, \frac{\theta_{max}}{2}\right)\right\}.$$

9. The method according to claim 8, wherein the maximum variation Max_Ripple of the discretized array factor $\psi(u_k, v_l) \equiv \psi_{kl} \in \mathbb{C}$ is reduced in azimuth and/or elevation angles within the sector area by applying filtering techniques, while keeping the maximum Power_Threshold of transmission power per antenna.

10. A MIMO transmitter for generating broadcast beam patterns in massive MIMO systems, the transmitter comprising:
a rectangular antenna array with a number $N_1$ of antenna elements in the horizontal direction and a number $N_2$ of antenna elements in the vertical direction, with inter-antenna spacing in the horizontal and vertical directions given by $d_x$ and $d_y$, respectively; and
processing means configured to:
generate broadcast beam patterns with determined beam widths in horizontal and vertical dimensions to cover a sector area of a cell by the rectangular antenna array radiating $N_1 \times N_2$ radiofrequency signals at a carrier frequency, the sector area being where at least one user equipment requests from the MIMO transmitter access to the cell; the beam widths in horizontal and vertical directions being determined by using an optimum set of excitation coefficients;
calculate the excitation coefficients by the following steps:
discretizing a continuous-space array factor $\psi(\theta, \varphi)$ to obtain a discretized array factor $\psi(u_k, v_l) \equiv \psi_{kl} \in \mathbb{C}$, formed by a discrete set of complex values $\psi_{kl} \in \mathbb{C}$, k=0,..., $N_1$-1, =0,..., $N_2$-1, where the indices k, l obey to a discretization over the elevation angle $\theta$ and the azimuth angle $\varphi$ of the antenna elements; and
obtaining the optimum set of excitation coefficients $\{a_{nm}\}$, in which $a_{nm} \in \mathbb{C}$ are complex excitation coefficients that minimize the following expression:

$$A_{vec}=\text{argmin}\{-H(A_{vec})-H(\Psi_{vec})\},$$

where $$A_{vec}=\{a_{nm}, n=0,\ldots,N_1-1, m=0,\ldots,N_2-1\}_{N_1 N_2 \times 1},$$

$$\Psi_{vec}=\{\psi_{kl}, k=0,\ldots,N_1-1, l=0,\ldots,N_2-1,\}_{N_1 N_2 \times 1}.$$

and H denotes the Shannon entropy for a sequence of N complex numbers $\{X_n\}$ which is defined as:

$$H(X) = -\sum_{n=0}^{N-1} |X_n|^2 \ln |X_n|^2.$$

11. The MIMO transmitter according to claim 10, wherein the processing means are further configured to obtain the discretization of the continuous-space array factor $\psi(\theta, \varphi)$ from the set of complex excitation coefficients $a_{nm}$ by:
introducing the directional cosines u, v as functions of the elevation angle $\theta$ and azimuth angle $\varphi$, by means of the expressions:

$$u = \sin\theta \cos\varphi,$$

$$v = \sin\theta \sin\varphi;$$

discretizing said directional cosines by introducing sampling periods $\Delta u, \Delta v$ that obey the Nyquist criterion, according to the following expressions:

$$\Delta u = \frac{2}{N_1}, \Delta v = \frac{2}{N_2},$$

$$u_k = k \cdot \Delta u, k = -\frac{N_1}{2}, \ldots, \frac{N_1}{2} - 1,$$

-continued $$v_l = l \cdot \Delta v, l = -\frac{N_2}{2}, \ldots, \frac{N_2}{2} - 1;$$

obtaining the discretized array factor $\psi(u_k, v_l) = \psi_{kl} \in \mathbb{C}$ is, for the set of complex excitation coefficients $a_{nm}$, in the form:

$$\psi_{kl} = \frac{1}{\sqrt{N_1 N_2}} \sum_{n=0}^{N_1-1} \sum_{m=0}^{N_2-1} a_{nm} \exp\left(j\frac{2\pi}{N_1}nk\right) \exp\left(j\frac{2\pi}{N_2}ml\right),$$

$$k = 0, \ldots, N_1 - 1, l = 0, \ldots, N_2 - 1,$$

and the continuous-space array factor $\Psi(\theta, \varphi)$ in the form:

$$\Psi(\theta, \varphi) = \sum_{n=0}^{N_1-1} \sum_{m=0}^{N_2-1} a_{nm} \exp\left(j\frac{2\pi d_x}{\lambda} n \sin\theta\cos\varphi\right) \exp\left(j\frac{2\pi d_y}{\lambda} m \sin\theta\sin\varphi\right),$$

where $\lambda$ is the wavelength at the carrier frequency of the antenna array.

12. The MIMO transmitter according to claim 10, wherein the excitation coefficients $a_{nm}$ satisfy the condition that $\Sigma_{n,m}|a_{nm}|^2=1$, to obtain a total transmission power of the antenna array equal to unity, and the relationship between the excitation coefficients $a_{nm}$ and the discretized array factor $\psi(u_k, v_l) = \psi_{kl} \in \mathbb{C}$ is:

$$\Psi = M_{N_1}^{IDFT} \cdot A \cdot M_{N_2}^{IDFT},$$

where $A=\{a_{nm}\}_{N_1 \times N_2}$ is a $N_1 \times N_2$ rectangular matrix containing the set of complex excitation coefficients $a_{nm}$, $\Psi=\{\psi_{kl}\}_{N_1 \times N_2}$ denotes its counterpart in the array factor domain, and the constituent IDFT matrix $M_M^{IDFT}$ of dimension M×M is defined as:

$$M_M^{IDFT} = \frac{1}{\sqrt{M}} \left\{\exp\left(j\frac{2\pi}{M}nk\right)\right\}_{M \times M}, n, k = 0, \ldots, M-1.$$

13. The MIMO transmitter according to claim 10, wherein the processing means are further configured to:
pad the excitation coefficients $a_{nm}$ with a number $P_1$ of zeros in the horizontal direction and a number $P_2$ of zeros in the vertical direction, by means of an extended matrix A' defined as:

$$A' = \{a_{ij}\}_{(N_1+P_1)\times(N_2+P_2)} : a_{ij} = \begin{cases} a_{nm}, & 0 \leq i < N_1, 0 \leq j < N_2 \\ 0, & \text{elsewhere} \end{cases},$$

to obtain a vector $A'_{vec}$ of the zero-padded excitation coefficients, $A'_{vec}=\{A_{vec}, 0, \ldots, 0\}_{(N_1+P_1)(N_2+P_2)\times 1}$; and calculate a global minimum of the following expression:

$$A'_{vec} = \mathrm{argmin}\{-H(A'_{vec}, -H(\Psi'_{vec})\},$$

where the entropy of the vector $A'_{vec}$ is calculated by means of the expression:

$$H(A'_{vec}) = H(\{A_{vec}, 0, \ldots, 0\}) = -\sum_{n,m=0}^{N_1 N_2 - 1} |a_{nm}|^2 \ln|a_{nm}|^2.$$

and where $\Psi'_{vec}$ denotes a vector form of an extended discretized array factor $\Psi'$ defined as the counterpart of the extended matrix A' in the array factor domain:

$$\Psi' = M_{N_1+P_1}^{IDFT} \cdot A' \cdot M_{N_2+P_2}^{IDFT}.$$

14. The MIMO transmitter according to claim 10, wherein the processing means are further configured to calculate a maximum variation, Max_Ripple, in decibels, of the discretized array factor $\psi(u_k, v_l) = \psi_{kl} \in \mathbb{C}$ to meet:
a maximum azimuth $\varphi_{max}$ angle and a maximum elevation angle $\theta_{max}$ for the sector area, and
a maximum Power_Threshold of transmission power per antenna,
by means of the following expressions:

$$\max|\psi_{ij}(dB) - \psi_{kl}(dB)|_{(i,j)=(k,l)} \leq \mathrm{Max\_Ripple}(dB); \forall\{(i,j),(k,l)\} \in C,$$

$$|a_{nm}|^2 \leq \mathrm{Power\_Threshold}, \forall m,n$$

where C denotes the discrete indices of $(u_k, v_l)$ points within the sector area (14):

$$C = \left\{(k, l): \varphi_k \in \left(-\frac{\varphi_{max}}{2}, \frac{\varphi_{max}}{2}\right), \theta_l \in \left(-\frac{\theta_{max}}{2}, \frac{\theta_{max}}{2}\right)\right\}.$$

15. A non-transitory computer program product comprising computer program code means adapted to perform all the steps of the method as defined in claim 1.

* * * * *